May 19, 1925.  1,538,176
D. H. DEERY
INDICATOR FOR AUTOMOBILE LAMPS
Filed March 29, 1924

INVENTOR
DANIEL H. DEERY.
BY
ATTORNEY

Patented May 19, 1925.

1,538,176

UNITED STATES PATENT OFFICE.

DANIEL H. DEERY, OF BRIDGEPORT, CONNECTICUT, ASSIGNOR TO THE D. & H. LAMP CO., OF BRIDGEPORT, CONNECTICUT, A COPARTNERSHIP COMPOSED OF DANIEL H. DEERY AND WILLIAM HENNESSEY.

INDICATOR FOR AUTOMOBILE LAMPS.

Application filed March 29, 1924. Serial No. 702,891.

*To all whom it may concern:*

Be it known that I, DANIEL H. DEERY, a citizen of the United States, and a resident of the city of Bridgeport, in the county of Fairfield and State of Connecticut, have invented certain new and useful Improvements in Indicators for Automobile Lamps, of which the following is a specification.

The present invention relates to an indicator for automobile lamps, and has for an object to provide a device of this character which will positively indicate to the driver whether or not his head-lamps are lighted, so that in the event that one of them goes out, he may immediately replace or fix it, thereby protecting both himself and other motorists against the menace and danger of driving with only one lamp. A further object is to provide an indicating device, which is of simple construction, and which may be conveniently attached to a head-lamp, without necessitating any drilling or other adapting alterations in the lamp structure.

Other objects are to provide a device which cannot get out of order, and which will harmonize with any design of lamp and in no way detract from its appearance.

With the above and other objects in view, embodiments of my invention are shown in the accompanying drawings, and these embodiments will be hereinafter more fully described with reference thereto, and the invention will be finally pointed out in the claims.

In the drawings.

Similar reference characters indicate corresponding parts throughout the several figures of the drawings.

Figure 1:
Fig. 1 is a view from the driver's seat of an automobile, at night, and showing the lighted head-lamps provided with indicating devices, according to the present invention.
Figure 2:
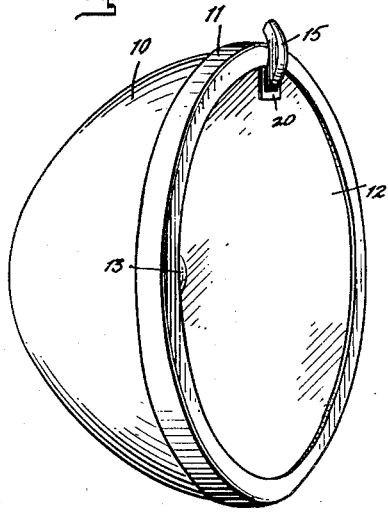
Fig. 2 is a perspective view, from the front, of a head-lamp provided with an indicating device, according to one embodiment of the invention.

Referring to the drawings, the head-lamp shown therein, and which is of the usual type, comprises a main body 10 having a circular flanged rim 11 secured thereon, by bayonet joints or the like, and holding in place the circular lens 12, the lamp also having a light bulb 13 and a reflector 14.

The indicating device, according to my invention, is secured to both head lamps, to indicate at the rear by showing spots of light above each lamp, and which are clearly visible to the driver, whether or not the lamps are lighted, it being immediately apparent to the driver when either one or both of them are out. This is clearly illustrated in Fig. 1.

The device, as shown in Figs. 2 to 6, comprises a curvilinear glass column 15, having a flat polished lens engaging face 16 at its lower end, and a flat polished light indicating face 17 at its upper end adapted when the device is in place upon the lamp to be above the same and faced rearwardly toward the driver. The face 16 is preferably in a vertical plane, while the face 17 is in an inclined plane. The face 16 is flanged, as at 18, for the purpose of attachment, and is adapted to be secured in place upon the lamp by means of a spring metal bracket, comprising an upper hook portion 19 adapted to be fitted over the periphery of the lens 12 beneath the rim 11, and an offset lower portion 20 having a substantially square aperture 21 therein, adapted to be engaged over the column in a manner to engage the flange 18 and tightly press the face 16 against the lens. The shoulder 22 between the hook portion 19 and the lower portion 20 is disposed beneath the inner periphery of the rim, and the set of the spring bracket is such that clamping of the rim in place tightly presses and retains the column in place, so that constant vibration or shock will not loosen or break it. The square aperture 21 prevents relative turning of the column, so that the end 17 is maintained in its projected relation to the periphery of the rim.

Figure 3:
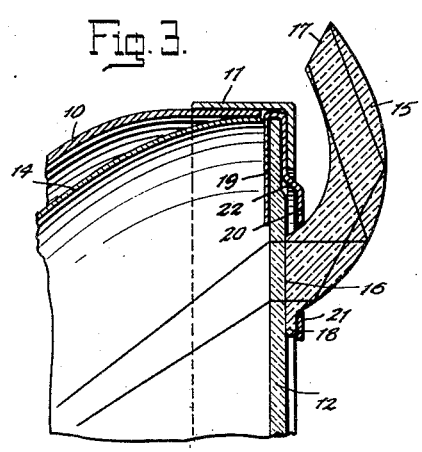
Fig. 3 is an enlarged vertical sectional view of the upper portion of a head lamp, equipped with the indicating device.
Figures 4, 5:
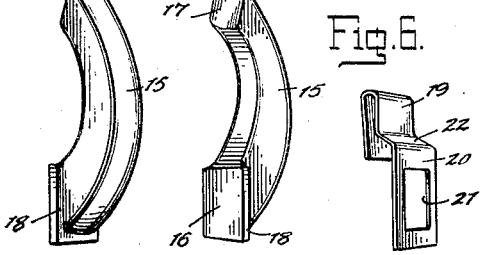
Fig. 4 is a perspective view of the device from the outer or forward side.
Fig. 5 is a perpective view from the inner or rear side.
Figure 6:
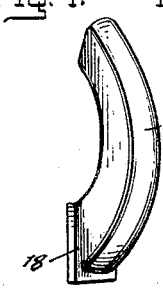
Fig. 6 is a perspective view of the attaching bracket employed.

The outer curved wall of the column is preferably rounded in cross-section, so as to concentrate the light rays striking it and reflected by it, and its curvature is such that the light rays passing through the lens are reflected to the upper face 17 in intensified relation, as indicated by the light rays lines in Fig. 3; and a clear illuminated light spot is visible to the driver. While the faces 16 and 17 are preferably clear and polished so that there is no opaque obstruction to the lamp rays, the walls of the column may be frosted by sand-blast, painted, or clear, as desired, the reflection of light rays to the face 17 being substantially the same in either case.

Figure 7:
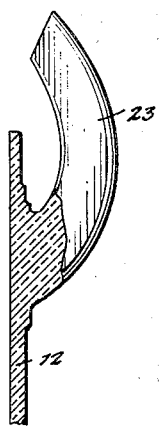
Fig. 7 is a view, partly in section and partly in elevation, of a modification, in which the device is formed integral with the head-lamp lens.

In Fig. 7 I have illustrated a modified form of the device in which the column 23 is formed integral with the lens 12 of the lamp, the function and operation of the same being similar to the first form. The column may be formed as one piece with the lens, or it may be fused or otherwise suitably secured thereto.

Figures 8, 9:
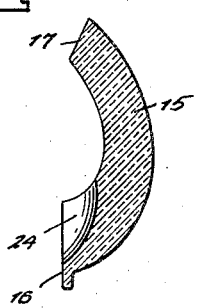
Fig. 8 is a perspective view, from the rear side, of a further modified form.
Fig. 9 is a vertical sectional view thereof.

In the modification illustrated in Figs. 8 and 9 the lower face 16 of the column is provided with a polished concave recess 24 extending from the upper edge into spaced relation to the lower edge and for a short distance along the inner curved wall, and forming a reflecting lens surface out of contact with the surface of the lamp lens. In both this form and that shown in Figs. 2 to 6 rubber or felt gaskets may be placed between the bracket and flange and between the adjacent surfaces of the face 16 and the lamp lens.

It is obvious from the foregoing that the device according to my invention may be readily attached to any type of lamp, without necessitating any change therein, and provides a clear and positive indication to the driver as to whether or not his headlamps are lighted. It will be understood, of course, that the device may be applied to other lamps, as tail-lamps, for the purpose of indicating whether they are lighted or not, and that the device is not restricted to automobile use.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:

1. As an article of manufacture, a light indicator device provided with means to attach it to a vehicle lamp in front of the lamp closure, comprising an elongated column of solid light conducting material having a light receiving surface at one end contiguous to the lamp closure and a light emitting surface at the other end disposed reversely to the direction of the light rays and beyond the periphery of the lamp closure, said column being continuously curved between its ends.

2. As an article of manufacture, a light indicator device provided with a bracket to attach it to a lamp in front of the lamp closure lens, comprising an elongated column of solid light conducting material having a light receiving surface at one end contiguous to the lens, a flanged base portion adjacent said light receiving surface, and a light emitting surface at the other end disposed reversely to the direction of the light rays and beyond the periphery of the lens, said column being continuously curved between its ends, said bracket comprising means to be secured to the lens and having an opening engaged by said column and resiliently pressing said base against said lens, said opening permitting passage of light to said light receiving surface.

3. In combination with a lamp including a casing, a lamp closure lens, and a lens retaining rim, a light indicating device provided with means to attach it to the lamp in front of the lamp closure lens and comprising an elongated column of solid light conducting material having a light receiving surface at one end contiguous to the lens, and a light emitting surface at the other end disposed reversely to the direction of the light rays and beyond the rim, the column being continuously curved between its ends, said attaching means comprising a bracket having a hook portion engaged over the periphery of said lens beneath said rim, and a portion engaging and supporting said column resiliently in relation to said lens.

Signed at Bridgeport, in the county of Fairfield, and State of Connecticut, this 26th day of March, 1924.

DANIEL H. DEERY.